United States Patent
Zhang et al.

(10) Patent No.: US 11,849,014 B2
(45) Date of Patent: Dec. 19, 2023

(54) PACKET FORMATS FOR VEHICULAR NETWORKS

(71) Applicant: Marvell Asia Pte Ltd, Singapore (SG)

(72) Inventors: Hongyuan Zhang, Fremont, CA (US); Liwen Chu, San Ramon, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/094,584

(22) Filed: Jan. 9, 2023

(65) Prior Publication Data
US 2023/0164247 A1 May 25, 2023

Related U.S. Application Data

(63) Continuation of application No. 17/446,261, filed on Aug. 27, 2021, now Pat. No. 11,553,065, which is a
(Continued)

(51) Int. Cl.
*H04L 69/323* (2022.01)
*H04L 5/00* (2006.01)
(Continued)

(52) U.S. Cl.
CPC .......... *H04L 69/323* (2013.01); *H04L 1/0003* (2013.01); *H04L 5/0091* (2013.01);
(Continued)

(58) Field of Classification Search
CPC ... H04L 69/323; H04L 1/0003; H04L 5/0091; H04W 28/0273; H04W 72/046; H04W 80/02; H04W 84/12
See application file for complete search history.

(56) References Cited

U.S. PATENT DOCUMENTS 9,088,376 B2  7/2015  Laulainen et al.
9,100,799 B1  8/2015  Thiagarajan et al.
(Continued)

OTHER PUBLICATIONS

IEEE P802.11 ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

(Continued)

*Primary Examiner* — Freshteh N Aghdam (57) ABSTRACT

A first communication device is configured to process packets that conform to a first physical layer (PHY) protocol for wireless vehicular communications and packets that conform to a second PHY protocol for wireless vehicular communications. The first communication device determines that one or more second communication devices neighboring the first communication device are not capable of processing packets that conform to the second PHY protocol. The first communication device transmits a first packet to a third communication device that is configured to process packets that conform to the first PHY protocol and packets that conform to the second PHY protocol. The first packet indicates that the one or more second communication devices neighboring the first communication device are not capable of processing packets that conform to the second PHY protocol to inform the third communication device of the one or more second communication devices.

20 Claims, 8 Drawing Sheets

Related U.S. Application Data continuation of application No. 16/847,437, filed on Apr. 13, 2020, now Pat. No. 11,108,900, which is a continuation of application No. 16/176,709, filed on Oct. 31, 2018, now Pat. No. 10,623,533.

(60) Provisional application No. 62/617,023, filed on Jan. 12, 2018.

(51) Int. Cl.
| | | |
|---|---|---|
| *H04L 1/00* | (2006.01) | |
| *H04W 28/02* | (2009.01) | |
| *H04W 72/044* | (2023.01) | |
| *H04W 80/02* | (2009.01) | |
| *H04W 84/12* | (2009.01) | |

(52) U.S. Cl.
CPC ..... *H04W 28/0273* (2013.01); *H04W 72/046* (2013.01); *H04W 80/02* (2013.01); *H04W 84/12* (2013.01)

(56) References Cited

U.S. PATENT DOCUMENTS

| | | | |
|---|---|---|---|
| 10,623,533 B2 | 4/2020 | Chu et al. | |
| 11,553,065 B2 | 1/2023 | Zhang et al. | |
| 2010/0046488 A1* | 2/2010 | Wentink | H04W 74/0816 370/465 |
| 2011/0206016 A1* | 8/2011 | Denteneer | H04W 74/0816 370/336 |
| 2012/0099530 A1* | 4/2012 | Morioka | H04W 74/06 370/328 |
| 2012/0127937 A1* | 5/2012 | Singh | H04W 12/50 370/329 |
| 2013/0089047 A1 | 4/2013 | Wentink | |
| 2015/0063189 A1* | 3/2015 | Merlin | H04W 72/042 370/312 |
| 2016/0021678 A1 | 1/2016 | Merlin et al. | |
| 2017/0063688 A1 | 3/2017 | Huang et al. | |
| 2017/0155679 A1 | 6/2017 | Choi | |
| 2017/0310514 A1 | 10/2017 | Zhang et al. | |
| 2017/0347370 A1* | 11/2017 | Kneckt | H04W 74/006 |
| 2018/0199271 A1* | 7/2018 | Viger | H04W 74/085 |
| 2018/0254861 A1 | 9/2018 | Cherian et al. | |
| 2018/0317128 A1 | 11/2018 | Chun et al. | |
| 2019/0123863 A1 | 4/2019 | Zhang et al. | |
| 2019/0207659 A1 | 7/2019 | Murakami et al. | |
| 2020/0004227 A1 | 1/2020 | Kang et al. | |
| 2020/0053055 A1 | 2/2020 | Kang et al. | |
| 2020/0244784 A1 | 7/2020 | Chu et al. | |

OTHER PUBLICATIONS

IEEE P802.11 ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE ComputerbrSociety, 620 pages (Feb. 2018).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

International Search Report and Written Opinion in International Patent Application No. PCT/US2018/058339, dated Mar. 27, 2019 (16 pages).

Invitation to Pay Additional Fees and Partial International Search Report in International Application No. PCT/US2018/058339, dated Jan. 25, 2019 (13 pages).

* cited by examiner

PACKET FORMATS FOR VEHICULAR NETWORKS

CROSS-REFERENCES TO RELATED APPLICATIONS

The present application is a continuation application of U.S. application Ser. No. 17/446,261 (now U.S. Pat. No. 11,553,065), filed on Aug. 27, 2021, entitled "Packet Formats for Vehicular Networks," which is a continuation of U.S. patent application Ser. No. 16/847,437 (now U.S. Pat. No. 11,108,900), entitled "Methods and Apparatus for Generation of Physical Layer Protocol Data Units," filed on Apr. 13, 2020, which is a continuation of U.S. patent application Ser. No. 16/176,709 (now U.S. Pat. No. 10,623,533), entitled "Methods and Apparatus for Generation of Physical Layer Protocol Data Units," filed on Oct. 31, 2018, which claims the benefit of U.S. Provisional Patent Application No. 62/617,023, entitled "MAC Support of 11P PHY Enhancement," filed on Jan. 12, 2018. All of the applications referenced above are incorporated herein by reference in their entireties.

FIELD OF THE DISCLOSURE

The present disclosure relates generally to communication networks and, more particularly, to physical layer protocol data unit formats used in vehicular communication networks.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

The IEEE 802.11p Standard specifies protocols for wireless access in vehicular environments (WAVE). Future WAVE standards are aimed at delivering improved car-to-car or car-to-infrastructure connectivity, infotainment features, etc.

SUMMARY

In an embodiment, a method for wireless communication is performed at a first communication device that is configured to process packets that conform to a first physical layer (PHY) protocol for wireless vehicular communications and packets that conform to a second PHY protocol for wireless vehicular communications. The first PHY protocol is different from the second PHY protocol. The method includes: determining, at the first communication device, that one or more second communication devices neighboring the first communication device are not capable of processing packets that conform to the second PHY protocol; and transmitting, by the first communication device, a first packet to a third communication device that is configured to process packets that conform to the first PHY protocol and packets that conform to the second PHY protocol, the first packet indicating that the one or more second communication devices neighboring the first communication device are not capable of processing packets that conform to the second PHY protocol to inform the third communication device of the one or more second communication devices.

In another embodiment, a first communication device comprises a wireless network interface device configured to process packets that conform to a first PHY protocol for wireless vehicular communications and packets that conform to a second PHY protocol for wireless vehicular communications. The first PHY protocol is different from the second PHY protocol. The wireless network interface device includes one or more integrated circuit (IC) devices configured to: determine that one or more second communication devices neighboring the first communication device are not capable of processing packets that conform to the second PHY protocol; and control the wireless network interface device to transmit a first packet to a third communication device that is configured to process packets that conform to the first PHY protocol and packets that conform to the second PHY protocol, the first packet indicating that the one or more second communication devices neighboring the first communication device are not capable of processing packets that conform to the second PHY protocol to inform the third communication device of the one or more second communication devices.

DETAILED DESCRIPTION

Generation, transmission, and reception of physical layer (PHY) data units, as described below, are discussed in the context of wireless local area networks (WLANs) that utilize protocols similar to protocols defined by the 802.11 Standard from the Institute of Electrical and Electronics Engineers (IEEE) merely for explanatory purposes. In other embodiments, however, PHY data unit generation/transmission/reception techniques are utilized in other types of wireless communication systems such as personal area networks (PANs), mobile communication networks such as cellular networks, metropolitan area networks (MANs), satellite communication networks, etc.

Figure 1:
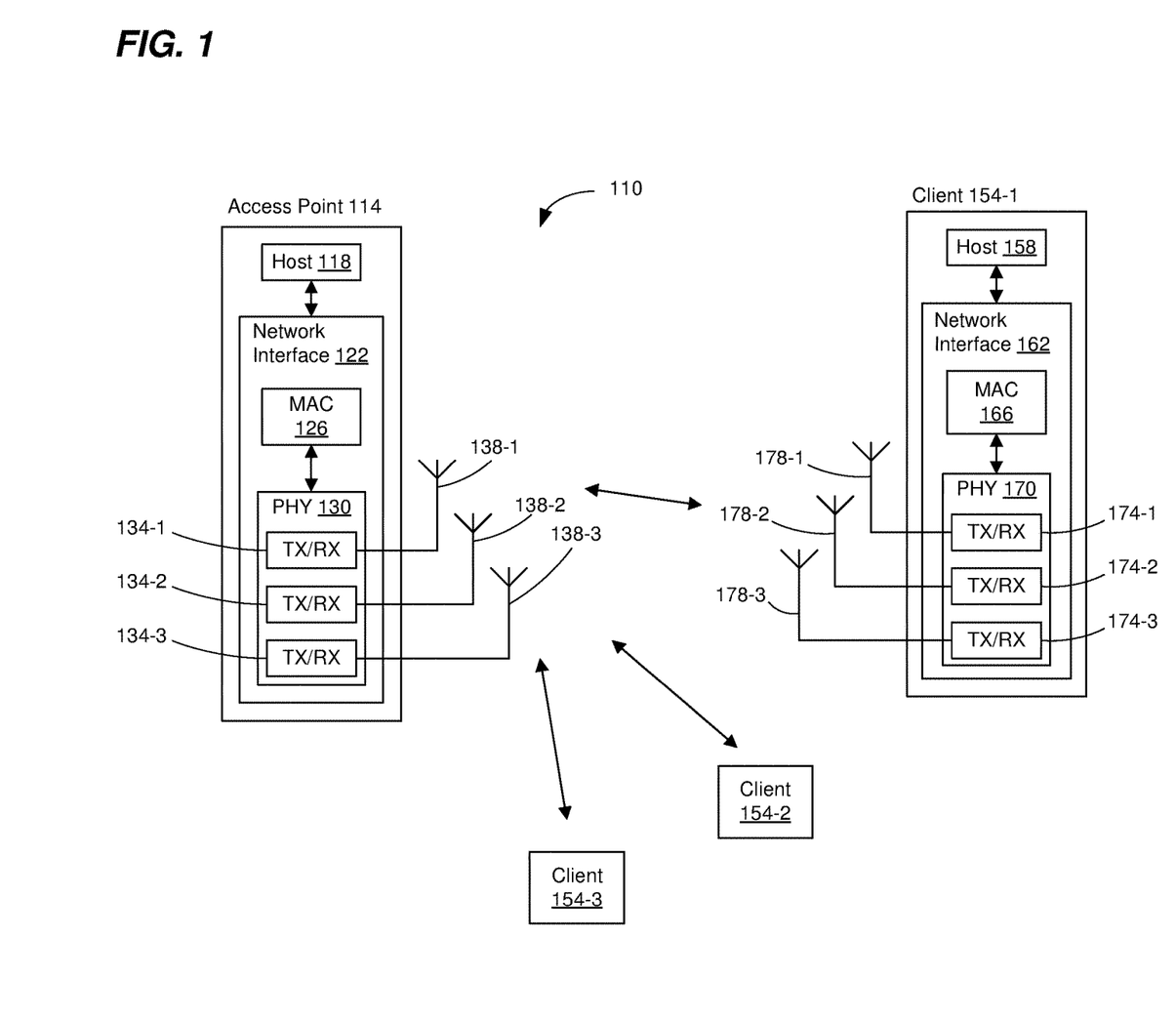
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface device 122 includes a medium access control (MAC) processor 126 and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard, a future version of the IEEE 802.11 Standard, or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PPDUs such as PHY protocol data units (PPDUs) for transmission via the antennas 138. Generating PHY protocol data units includes generating PHY preambles and PHY midambles of the PHY protocol data units, at least in some embodiments. Similarly, the PHY processor 130 may be configured to receive PPDUs that were received via the antennas 138, and extract MAC layer data units encapsulated within the PPDUs. The PHY processor 130 is configured to process PHY preambles and PHY midambles of the PHY protocol data units to perform functions such as one or more of synchronization, automatic gain control (AGC) adjustment, channel estimation, etc., at least in some embodiments. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network interface device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PPDUs such as PPDUs for transmission via the antennas 178. Generating PHY protocol data units includes generating PHY preambles and PHY midambles of the PHY protocol data units, at least in some embodiments. Similarly, the PHY processor 170 may be configured to receive PPDUs that were received via the antennas 178, and extract MAC layer data units encapsulated within the PPDUs. The PHY processor 170 is configured to process PHY preambles and PHY midambles of the PHY protocol data units to perform functions such as one or more of synchronization, AGC adjustment, channel estimation, etc., at least in some embodiments. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

In an embodiment, the WLAN 110 corresponds to a vehicular communication environment in which the AP 114 is located in a fixed location proximate to a roadway, and the client stations 154 are located in vehicles travelling on the roadway. In some embodiments corresponding to a vehicular communication environment, client stations 154 in different vehicles directly communicate with one another. In such environments, Doppler effects are more pronounced as compared to home or office WLAN environments. Additionally, longer range communications may be required in such environments as compared to home or office environments. Described below are example PPDU generation/transmission/reception techniques that are useful for environments that require longer ranges and/or in which Doppler effects are more pronounced, as compared to typical existing home or office WLANs environments.

In a vehicular communication environment, a client station 154 is not a member of a basic service set (BSS) and the client station 154 is said to communicate "outside the context of BSS," in an embodiment. In various embodiments, a sending station (e.g., client station 154 or AP 114) sets a BSSID field of a MAC header to a Wildcard BSSID, uses default enhanced distributed channel access (EDCA) parameters, and uses a mandatory data rate unless an optional data rate is negotiated. In an embodiment, a sending station only transmits a packet or frame within a transmission opportunity (TXOP).

Figure 2:
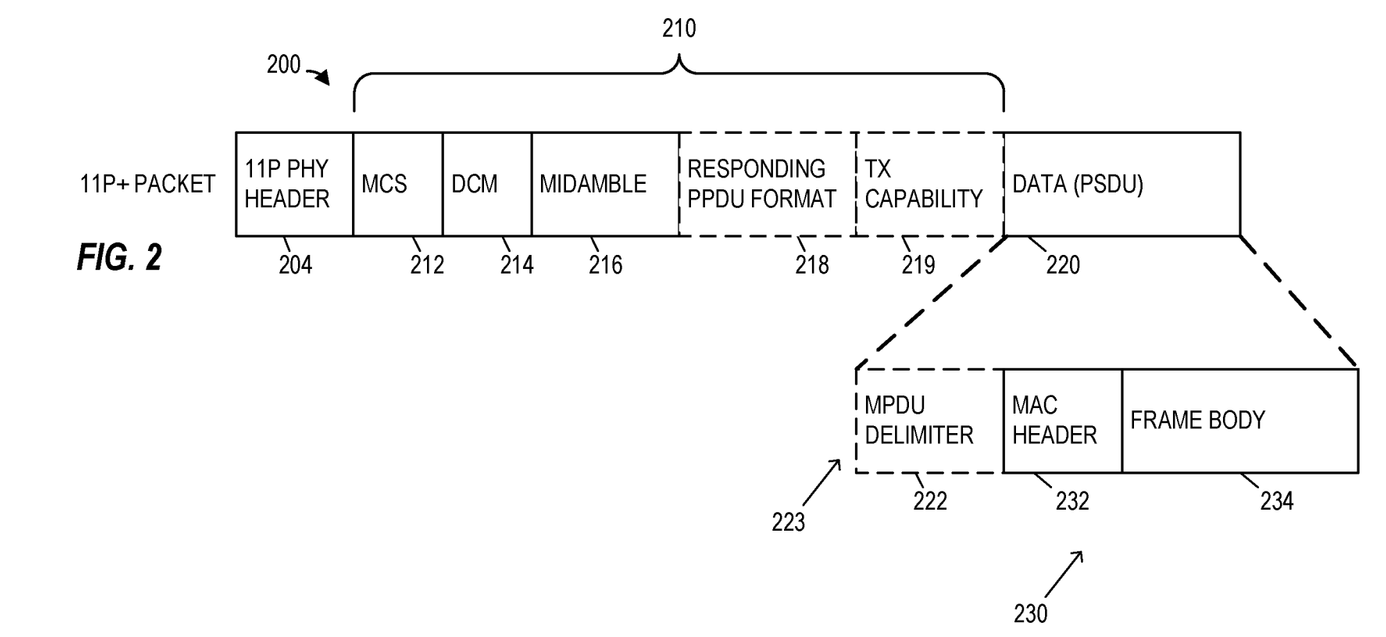
FIG. 2 is a diagram of an example physical layer (PHY) protocol data unit (PPDU), according an embodiment.

FIG. 2 is a diagram of an example PPDU 200 that the network interface device 122 (FIG. 1) is configured to generate and transmit to one or more client stations 154, according to an embodiment. The network interface device 162 (FIG. 1) may also be configured to generate/transmit PPDUs the same as or similar to the PPDU 200 to the AP 114 or to another client station 154. In various embodiments, the PPDU 200 has a format similar to a PPDU format defined by the IEEE 802.11a Standard, the IEEE 802.11n Standard, the IEEE 802.11ac Standard, or a current draft of the IEEE 802.11ax Standard. In an embodiment, the PPDU 200 is downclocked with respect to the PPDU format defined by the corresponding IEEE 802.11 Standard (or draft Standard).

The PPDU 200 is similar to an IEEE 802.11p packet, but is improved or enhanced with one or more features as described herein (referred to herein as "11p enhanced," or "11p+"). The PPDU 200 includes a legacy PHY header 204, a non-legacy PHY header 210, and a data portion 220, in an embodiment. The legacy PHY header 204 generally corresponds to an IEEE 802.11p PHY header ("11p header"), in an embodiment. In an embodiment, a legacy PPDU ("11p PPDU") includes the legacy PHY header 204 and the data portion 220, but omits the non-legacy PHY header 210.

The non-legacy PHY header 210 ("11p+ header") includes one or more fields that provide improved functionality relative to the IEEE 802.11p Standard, in various embodiments. In the embodiment shown in FIG. 2, for example, the non-legacy PHY header 210 includes a modulation and coding scheme (MCS) field 212 that indicates an MCS with which the data portion 220 is encoded, a dual sub-carrier modulation (DCM) field 214 that indicates whether a dual sub-carrier feature is enabled along with suitable parameters (e.g., carrier spacing), a midamble field 216 that indicates whether the data portion 220 includes a midamble along with suitable parameters, a responding PPDU format field 218 that indicates a PPDU format of a responding PPDU to be transmitted in response to the PPDU 200, and a transmitter (TX) capability field 219 that indicates a PPDU format capability of the communication device transmitting the PPDU 200 (e.g., whether the communication device supports legacy only, non-legacy, 11p, 11p+, or other suitable PPDU formats). In other embodiments, the non-legacy PHY header 210 includes additional or fewer fields. In some embodiments, for example, the responding PPDU format field 218 is omitted. In some embodiments, the TX capability field 219 is omitted. In an embodiment, the responding PPDU format field 218 has a first value ("0") that indicates an 11p PPDU format, a second value ("1") that indicates an 11p+ PPDU format, etc. In another embodiment, for example, the responding PPDU format field 218 has a first value that indicates a same format as an initiating frame or a second value that indicates a backwards compatible format (e.g., 11p format).

In some embodiments, the PPDU 200 includes one or more PHY midambles (not shown) within the data portion 220, for example, to allow a receiving device to update channel estimation, adjust synchronization, etc., during reception of the PPDU 200. Each PHY midamble includes one or more OFDM symbols that include training information (sometimes referred to as calibration information), at least a portion of which may be used for one or more of retraining channel training or estimation, refining frequency synchronization or carrier frequency offset (CFO) adjustment, calculating a steering matrix or other parameters used in beamforming, adapting to a communication link, AGC adjustment, etc.

The data portion 220 includes data, for example, a PHY service data unit (PSDU) for a receiving communication device. In the embodiment shown in FIG. 2, the data portion 220 includes an MPDU 230 having a MAC header 232 and frame body 234. In some embodiments, the PPDU 200 includes a frame length indicator or MPDU length indicator 223 that indicates a length, in octets, of the MPDU 230. The frame length indicator 223 is provided in addition to a packet length indicator or PPDU length field (not shown) of the legacy PHY header 204 that indicates a length, in OFDM symbols, of the PPDU 200. In the embodiment shown in FIG. 2, the data portion 220 has an MPDU delimiter 222 that includes the MPDU length indicator 223. In another embodiment, the non-legacy PHY header 210 includes an MPDU length indicator field (not shown) and the MPDU delimiter 222 is optionally omitted. In some embodiments, the legacy PHY header 204 is omitted, for example, as a "green field format" packet.

Figure 3A:
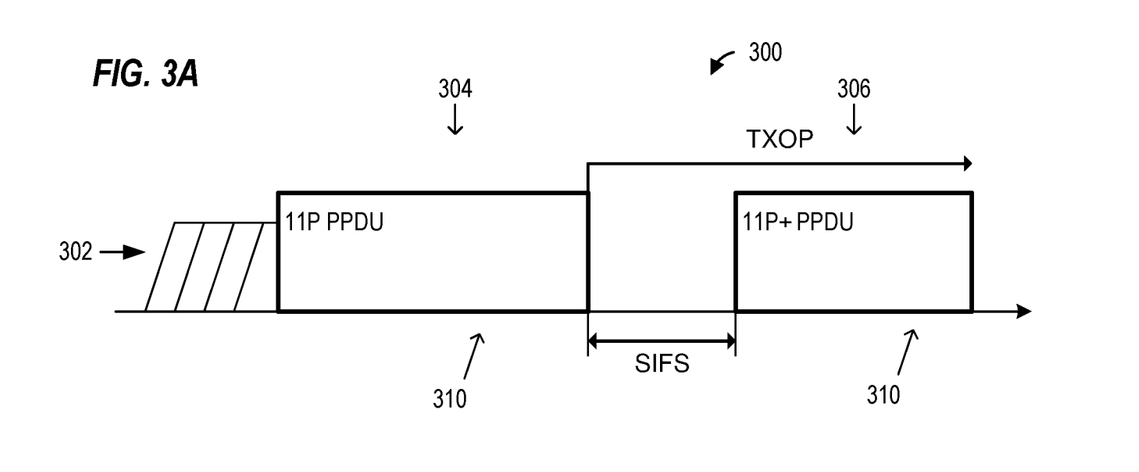
FIG. 3A is a diagram of an example broadcast packet flow, according to an embodiment.

FIG. 3A is a diagram of an example broadcast packet flow 300, according to an embodiment. The broadcast packet flow 300 includes a first PPDU 304 and a second PPDU 306. In an embodiment, the network interface device 122 (FIG. 1) is configured to generate and transmit the first PPDU 304 and the second PPDU 306, and the network interface device 162 (FIG. 1) is configured to receive and process one or both of the first PPDU 304 and the second PPDU 306. In some embodiments, the network interface device 162 (FIG. 1) is configured to generate and transmit the first PPDU 304 and the second PPDU 306, and the network interface device 122 (FIG. 1) is configured to receive and process one or both of the first PPDU 304 and the second PPDU 306.

In some scenarios, the AP 114 (or client station 154) has a plurality of neighbor communication devices that support different PPDU formats and/or have different PPDU processing capabilities. In an embodiment, for example, a first client station (neighbor communication device) 154-2 has a "legacy-only" capability and can process legacy (11p) packets, but cannot process non-legacy (11p+) packets, while a second client station (neighbor communication device) 154-3 has an enhanced capability and can process both legacy (11p) packets and non-legacy (11p+) packets. In various embodiments, the network interface device 122 of the AP 114 generates and transmits a same MPDU 310 via two or more broadcast packets (PPDUs) having at least two different packet formats to accommodate legacy-only devices and non-legacy devices. In the embodiment shown in FIG. 3A, the AP 114 generates and transmits the first PPDU 304 to include the MPDU 310 with a first PPDU format and generates and transmits the second PPDU 306 to include the MPDU 310 with a second PPDU format. In an embodiment, the first PPDU format of the first PPDU 304 is the legacy or 11p PPDU format (described above) and the second PPDU format of the second PPDU 306 is the non-legacy or 11p+ PPDU format (as shown in FIG. 2 described above). In another embodiment, the first PPDU format is the non-legacy PPDU format and the second PPDU format is the legacy PPDU format.

In some embodiments, the AP 114 generates and transmits the first PPDU 304 and the second PPDU 306 within a same transmission opportunity (TXOP). In an embodiment, the AP 114 generates the first PPDU 304 to include a duration field that indicates a duration covering a subsequent transmission of the second PPDU 306. In an embodiment, the AP 114 transmits the second PPDU 306 after a short interframe space (SIFS) that follows the transmission of the first PPDU 304. In some embodiments, the AP 114 (or client station 154) generates and transmits the second PPDU 306 immediately after transmission of the first PPDU 304.

Figure 3B:
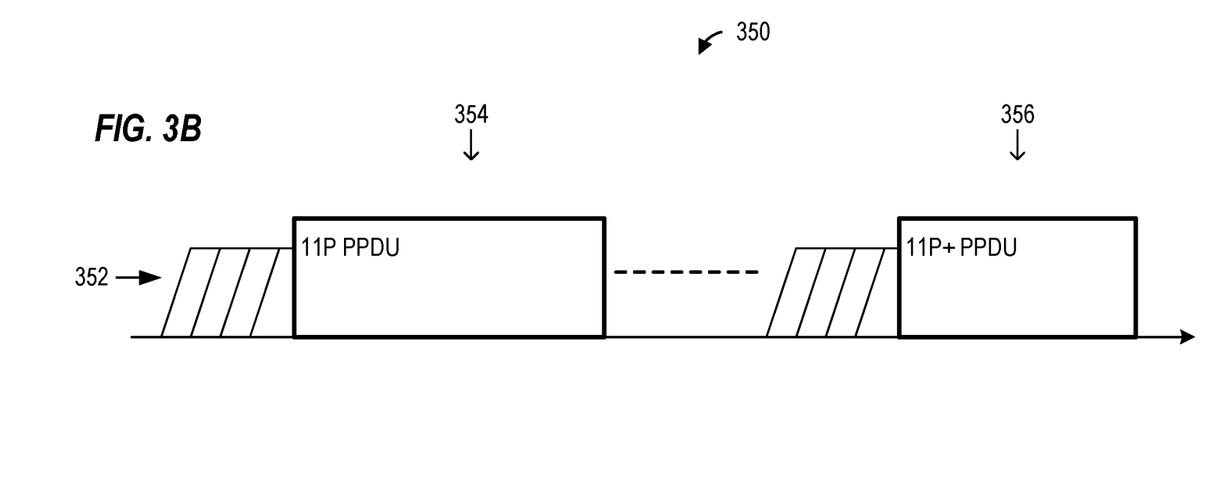
FIG. 3B is a diagram of an example broadcast message flow, according to another embodiment.

FIG. 3B is a diagram of an example broadcast packet flow 350, according to another embodiment. The broadcast packet flow 350 is similar to the broadcast packet flow 300, but instead a first PPDU 354 (similar to the first PPDU 304) is transmitted in a separate TXOP from a second PPDU 356 (similar to the second PPDU 306), in an embodiment.

Figure 4:
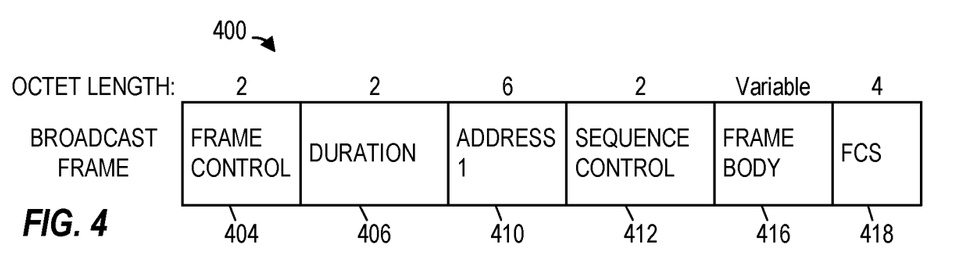
FIG. 4 is a diagram of an example medium access control (MAC) protocol data unit (MPDU), according to an embodiment.

FIG. 4 is a diagram of an example medium access control (MAC) protocol data unit (MPDU) 400, according to an embodiment. The MPDU 400 generally corresponds to the MPDU 310 and is a broadcast frame, in an embodiment. The number above each field in FIG. 4 indicates the number of octets ("Octet Length") occupied by the corresponding field. Accordingly, the MPDU 400 includes a frame control field 404 (2 octets), a duration/ID field 406 (2 octets), a first address (A1) field 410 (6 octets), a sequence control field 412 (2 octets), a frame body (variable length) 416, and a frame check sequence (FCS) field (4 octets) 418. In some embodiments, the frame body 416 is omitted (e.g., a null data frame).

The address field 410 is a 48 bit (6 octet) field that includes a globally unique MAC address of a device associated with the MPDU 400, such as a transmitting device of the MPDU 400. In an embodiment, the MPDU 400 omits other address fields (e.g., a recipient address field that identifies one or more receiving devices of the MPDU 400), for example, to decrease a length of the MPDU 400. In an embodiment, a frame type field (not shown) and a frame subtype field (not shown) of the frame control field 404 indicate that the MPDU 400 is a non-legacy (11p+) broadcast frame that omits the recipient address field. In some embodiments, the MPDU 400 omits one or more other fields illustrated in FIG. 4, for example, the sequence control field 412. In some embodiments, the MPDU 400 includes additional fields not illustrated in FIG. 4.

Figure 5:
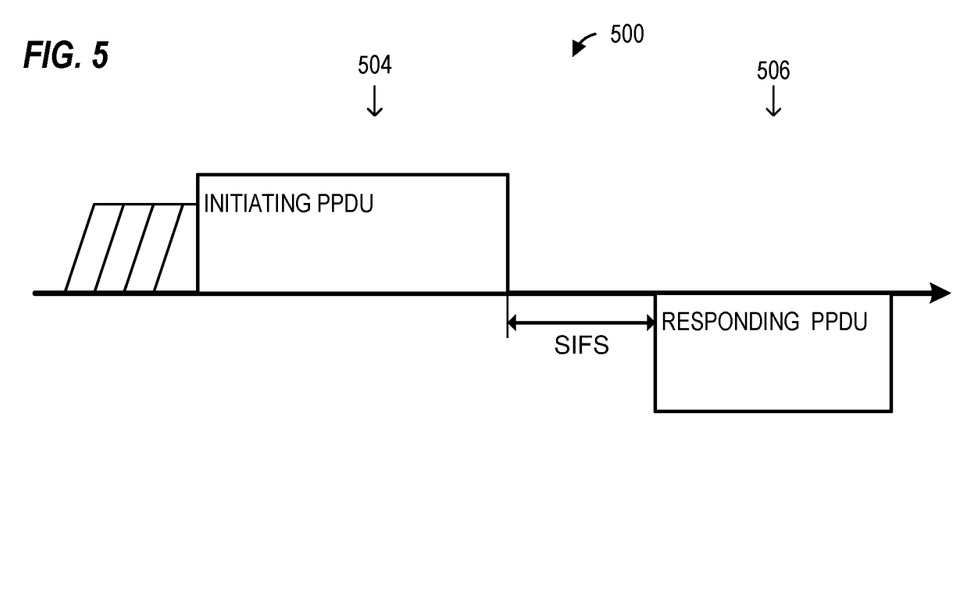
FIG. 5 is a diagram of an example unicast packet flow, according to an embodiment.

FIG. 5 is a diagram of an example unicast packet flow 500, according to an embodiment. The unicast packet flow 500 includes a first PPDU 504 and a second PPDU 506 as unicast packets. In an embodiment, the network interface device 122 (FIG. 1) is configured to generate and transmit the first PPDU 504 and the network interface device 162 (FIG. 1) is configured to generate and transmit the second PPDU 506, while the network interface device 122 is configured to receive and process the second PPDU 506 and the network interface device 162 is configured to receive and process the first PPDU 504. In another embodiment, the network interface device 162 is configured to generate and transmit the first PPDU 504 and the network interface device 122 is configured to generate and transmit the second PPDU 506, while the network interface device 162 is configured to receive and process the second PPDU 506 and the network interface device 122 is configured to receive and process the first PPDU 504. In yet another embodiment, the network interface device 162 of a first communication device generates and transmits the first PPDU 504 and the network interface device 162 of a second communication device generates and transmits the second PPDU 506.

With reference to FIG. 5, the first PPDU 504 is an "initiating PPDU" transmitted by an initiating communication device to a responding communication device, where the first PPDU 504 causes the responding communication device to transmit the second PPDU 506 ("responding PPDU"), in an embodiment. In an embodiment, the responding PPDU is transmitted after a short interframe space (SIFS) that follows the transmission of the initiating PPDU. In various embodiments, the initiating communication device is an AP 114 or client station 154, and the responding communication device is a different AP 114 or different client station 154. In various embodiments, the responding communication device determines a PPDU format ("second PPDU format") of the second PPDU 506 based on one or more parameters. In some embodiments, the parameters include PPDU formats of other received packets, including received packets from the responding communication device, received packets from neighbor communication devices of the initiating communication device, or received packets from neighbor communication devices of the responding communication device. In some embodiments, the parameters include PPDU formats that are indicated by a field within a received packet (e.g., responding PPDU format field 218 and/or TX capability field 219). In some embodiments, the parameters include characteristics of the packet to be transmitted, for example, the length, size, type, MCS, or other suitable characteristic. In some embodiments, the parameters include characteristics of a wireless communication channel on which the PPDU is to be transmitted.

Although FIG. 5 illustrates an embodiment where a responding communication device determines a PPDU format for the responding PPDU 506, which is transmitted in response to the initiating PPDU 504, in some embodiments, a communication device (e.g., AP 114 or client station 154) determines the PPDU format for the PPDU 506 without being "triggered" or prompted by a particular received PPDU. In an embodiment, for example, an initiating communication device determines the PPDU format of the PPDU 504, in a similar manner to the responding communication device, as described below.

In an embodiment, the responding communication device receives the first PPDU 504, which has a PHY header that includes a first field that indicates a first PPDU format of the first PPDU 504 and a second field that indicates a second PPDU format of the second PPDU 506 to be transmitted in response to the first PPDU 504. In an embodiment, for example, the first PPDU 504 generally corresponds to the PPDU 200 and includes a legacy PHY header 204 (or non-legacy PHY header 210) that indicates a format of the PPDU 200 and a responding PPDU format field 218 (described above) that indicates a PPDU format of the second PPDU 506. In an embodiment, the first PPDU format of the first PPDU 504 is a non-legacy PPDU format, such as the 11p+ format, while the second PPDU format is a legacy PPDU format, such as the 11p format. Different PPDU formats are used by the first and second PPDUs, in other embodiments.

In an embodiment, the responding communication device determines the second PPDU format of the PPDU 506 based on a capability of one or more third communication devices. The third communication device is a communication device that is different from the first and second communication devices, in other words, different from the communication devices that transmit the PPDUs 504 and 506. In some embodiments, the third communication device has a "legacy-only" capability or enhanced capability, as described above. In an embodiment, the third communication device is a neighbor communication device that is adjacent to or physically near the initiating communication device and/or the responding communication device. In other words, a neighbor communication device is an AP or client station that is likely to receive a PPDU transmitted by or transmitted to the initiating communication device or the responding communication device.

In various embodiments, the responding communication device (or initiating communication device) determines the capability of the third communication device using a PPDU received from the third communication device, for example, by using one or more of a STA type indication in a received PPDU or a PPDU format of the received PPDU. In various embodiments, the STA type indication indicates a PPDU format capability of the third communication device. In an embodiment, the STA type indication is the TX capability field 219 (FIG. 2). In another embodiment, the STA type indication is a field similar to the TX capability field 219, but located within the MAC header 232 (FIG. 2) or within the frame body 234 (FIG. 2) of an MPDU received from the third communication device.

In an embodiment, the responding communication device (or initiating communication device) determines that the third communication device has the 11p capability when the responding communication device (or initiating communication device) receives a PPDU from the third communication device that indicates that the third communication device is an 11p device. In an embodiment, the responding communication device determines that the third communication device has the enhanced (11p+) capability after an 11p+ PPDU is correctly received from the third communication device. In an embodiment, the responding communication device (or initiating communication device) transmits a broadcast PPDU having an 11p format after the responding communication device (or initiating communication device) has detected a neighbor 11p device. In an embodiment, the responding communication device uses the 11p PPDU format for the responding PPDU addressed to the third communication device when the responding communication device detects that the third communication device is 11p device. In an embodiment, the responding communication device transmits a broadcast PPDU in 11p+ format when the responding communication device detects no neighbor 11p device. In an embodiment, the responding communication device determines that the third communication device has the enhanced (11p+) capability based on the receipt of an 11p+ PPDU and uses the 11p+ PPDU format for the responding PPDU addressed to the third communication device only when the third communication device has the enhanced capability. In some embodiments, the responding communication device determines the capability of the third communication device from a neighbor capability indicator received from the third communication device (e.g., in a suitable field of a legacy PHY header, a non-legacy PHY header, MAC header, data field, etc.). In some embodiments, the neighbor capability indicator is received from the initiating communication device (e.g., as a field in a neighbor report response received from the initiating communication device, for example, in the data portion 220).

In an embodiment, the responding communication device determines the PPDU format for the PPDU 506, when transmitted to a non-legacy (11p+) communication device, based on whether a second (unicast) PPDU having a second PPDU format has been correctly received. In an embodiment, for example, the responding communication device determines that the PPDU format for the PPDU 506 is an 11p+ format when at least one 11p+ format unicast PPDU has been received. In another embodiment, for example, the responding communication device determines that the PPDU format is an 11p format when at least one 11p format unicast PPDU has been received. In some embodiments, the PPDU format for the PPDU 506 is a default format (e.g., a legacy format or 11p format) unless a different format (e.g., non-legacy or 11p+) PPDU has been received, after which the different format is used for subsequent PPDU transmissions.

In an embodiment, the responding communication device determines the PPDU format for the PPDU 506, when transmitted to a non-legacy (11p+) communication device, based on a length of the PPDU 506. In an embodiment, for example, the responding communication device uses a legacy PPDU format for a PPDU having a length less than a first threshold (e.g., a duration corresponding to a wireless channel coherence time, or time-scale at which fading occurs) and a non-legacy PPDU format for a PPDU length that meets or exceeds the first threshold. In this embodiment, as an example, the legacy PPDU format is the 11p PPDU format and the non-legacy PPDU format is the 11p+ PPDU format, which includes one or more midambles to improve reception of a PPDU having a duration longer than the wireless channel coherence time.

In an embodiment, the responding communication device determines the PPDU format for the PPDU 506, when transmitted to a non-legacy (11p+) communication device, based on a channel load of a wireless communication channel on which the PPDU 506 is to be transmitted. In an embodiment, the responding communication device determines the PPDU format as a legacy PPDU format when the channel load reaches a busy threshold and determines the PPDU format as a non-legacy format when the channel load does not reach the busy threshold. In some embodiments, for example, when the channel is busy (e.g., when a number of collisions reaches a threshold, a number of active transmitters reaches a threshold, etc.), the responding communication device selects the legacy PPDU format and selects the non-legacy PPDU format when the channel is not busy. In one such embodiment, the responding communication device transmits the PPDU 506 as a legacy PPDU format when the channel is busy, and transmits the PPDU 506 twice, as a legacy PPDU format and a non-legacy PPDU format, when the channel is not busy.

In an embodiment, the responding communication device determines the PPDU format for the PPDU 506, when transmitted to a non-legacy (11p+) communication device, based on a travel speed of the responding communication device. In an embodiment, for example, the responding communication device determines the PPDU format to be the legacy PPDU format when a travel speed of the responding communication device is below a speed threshold, for example, 30 miles per hour, 60 miles per hour, or another suitable threshold, and determines the PPDU format to be the non-legacy PPDU format when the travel speed meets the speed threshold. In an embodiment, for example, the legacy PPDU format is the 11p PPDU format and the non-legacy PPDU format is the 11p+ PPDU format, which includes one or more midambles to improve reception of the PPDU when the travel speed of the responding communication device meets the speed threshold.

Figure 6:
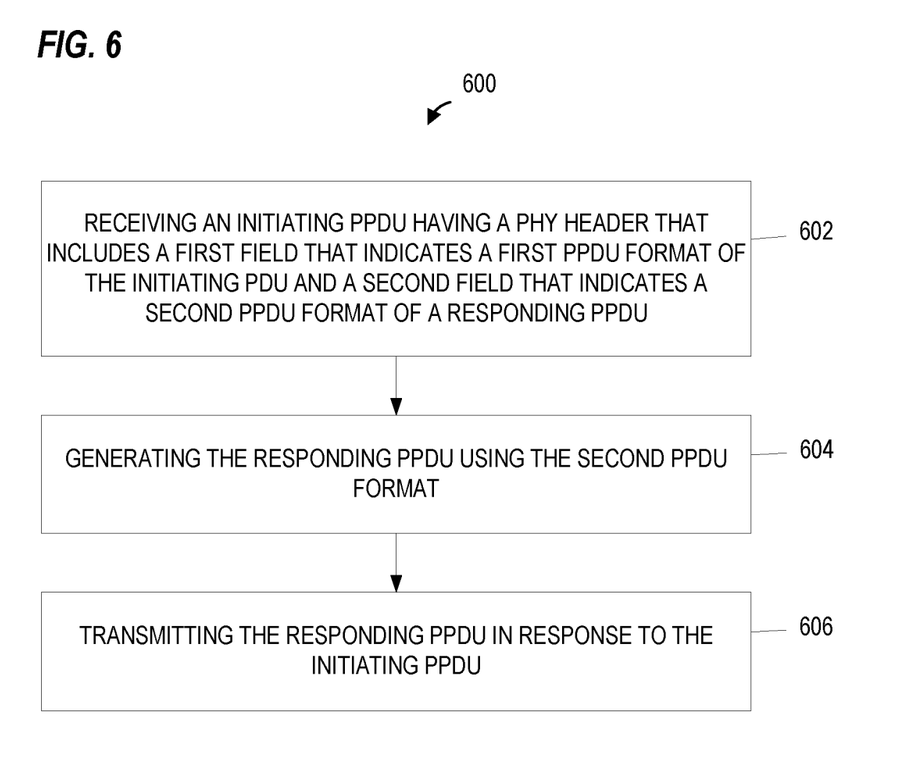
FIG. 6 is a flow diagram of an example method for transmitting a PPDU, according to an embodiment.

FIG. 6 is a flow diagram of an example method 600 for transmitting a PPDU by a first communication device, according to an embodiment. With reference to FIG. 1, the method 600 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 600. According to another embodiment, a MAC processor such as the MAC processor 126 or the MAC processor 166 is also configured to implement a portion of the method 600.

At block 602, an initiating PPDU is received at the first communication device from a second communication device. The initiating PPDU has a PHY header that indicates a first PPDU format of the initiating PPDU and a PPDU format field that indicates a second PPDU format of a responding PPDU to be transmitted in response to the initiating PPDU. In an embodiment, the initiating PPDU generally corresponds to the PPDU 200 and the responding PPDU format field 218 is the second field that indicates the second PPDU format. In an embodiment, the first communication device determines the format of the initiating PPDU using a format of the legacy PHY header 204, for example, based on an order and modulation (e.g., BPSK, QBPSK, etc.) of one or more OFDM symbols of the legacy PHY header 204.

At block 604, the responding PPDU is generated using the second PPDU format.

At block 606, the responding PPDU is transmitted in response to the initiating PPDU. In an embodiment, the initiating PPDU generally corresponds to the PPDU 504 (FIG. 5) and the responding PPDU generally corresponds to the PPDU 506 (FIG. 5).

In some embodiments, the first PPDU format is a non-legacy PPDU format and the second PPDU format is a legacy PPDU format. In an embodiment, for example, the non-legacy PPDU format is the 802.11p+ PPDU format and the legacy PPDU format is the 802.11p PPDU format.

In some embodiments, the PHY header of the initiating PPDU has a modulation and coding scheme (MCS) field that indicates an MCS of the initiating PPDU. In an embodiment, the responding PPDU is generated using the second PPDU format and the MCS indicated by the MCS field. In an embodiment, for example, the MCS field generally corresponds to the MCS field 212 (FIG. 2).

In an embodiment, the responding PPDU includes a medium access control (MAC) protocol data unit (MPDU) delimiter having an MPDU length field that indicates an octet length of a corresponding MPDU of the initiating PPDU. In an embodiment, the MPDU delimiter generally corresponds to the MPDU delimiter 222 (FIG. 2) and the MPDU length field corresponds to the MPDU length field 223. In another embodiment, the initiating PPDU includes a PHY header having an MPDU length field that indicates an octet length of a corresponding MPDU of the initiating PPDU.

Figure 7:
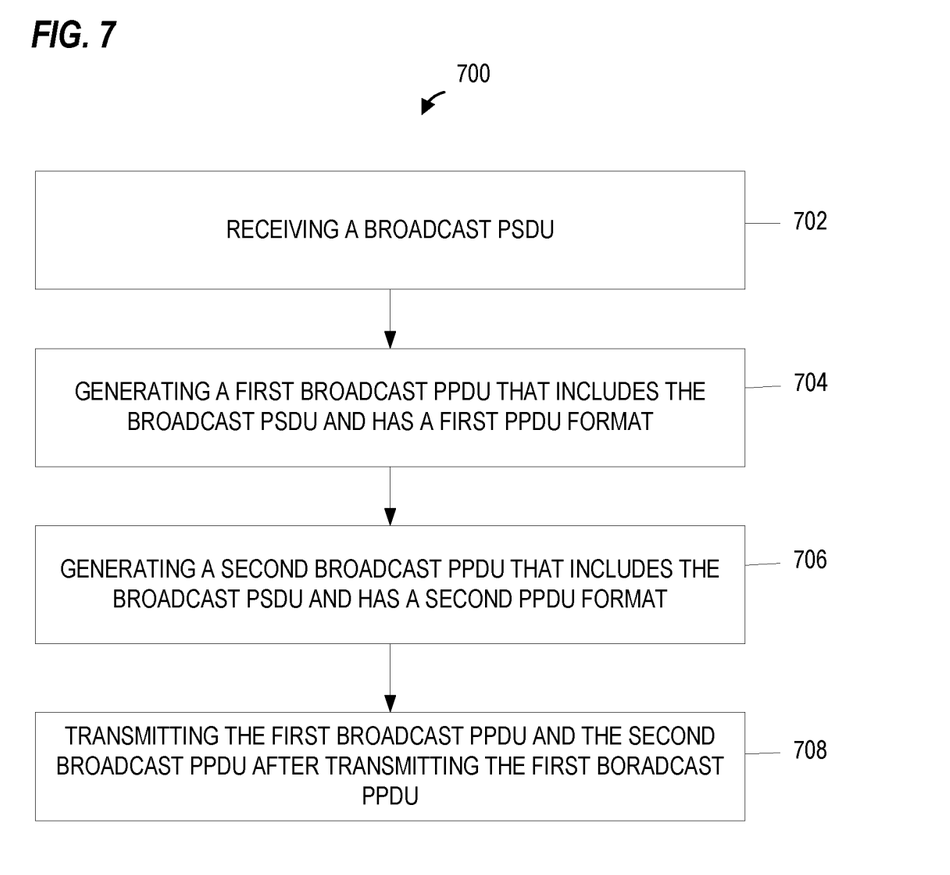
FIG. 7 is a flow diagram of an example method for transmitting a broadcast PHY service data unit (PSDU), according to an embodiment.

FIG. 7 is a flow diagram of an example method 700 for transmitting a broadcast PSDU, according to an embodiment. With reference to FIG. 1, the method 700 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 700. According to another embodiment, a MAC processor such as the MAC processor 126 or the MAC processor 166 is also configured to implement a portion of the method 700.

At block 702, the broadcast PSDU is received. In an embodiment, the broadcast PSDU generally corresponds to the PSDU of the data portion 220 (FIG. 2).

At block 704, a first broadcast PHY protocol data unit (PPDU) is generated that includes the broadcast PSDU and has a first PPDU format.

At block 706, a second broadcast PPDU is generated that includes the PSDU and has a second PPDU format that is different from the first PPDU format. In an embodiment, the first broadcast PPDU generally corresponds to the PPDU 304 (FIG. 3) and the second broadcast PPDU generally corresponds to the PPDU 306 (FIG. 3). In another embodiment, the first broadcast PPDU generally corresponds to the PPDU 354 and the second broadcast PPDU generally corresponds to the PPDU 356. In an embodiment, the first broadcast PPDU is generated to include a duration indicator that indicates the presence of the second broadcast PPDU. In an embodiment, for example, the duration indicator is a duration field (not shown) of the legacy PHY header 204. In an embodiment, the duration indicator is configured to reserve a transmission opportunity (TXOP) that includes the first broadcast PPDU and the second broadcast PPDU. In some embodiments, the first PPDU format is a legacy PPDU format configured to be processable by a legacy communication device, for example, the 802.11p PPDU format. In some embodiments, the second PPDU format is a legacy PPDU format configured to be processable by a legacy communication device. In an embodiment, the first broadcast PPDU has a legacy PPDU format and the second broadcast PPDU has a non-legacy PPDU format. In another embodiment, the first broadcast PPDU has a non-legacy PPDU format and the second broadcast PPDU has a legacy PPDU format.

At block 708, the first broadcast PPDU is transmitted, and the second broadcast PPDU is transmitted after transmitting the first broadcast PPDU. In some embodiments, the second broadcast PPDU after a short interframe space (SIFS) period after the first broadcast PPDU. In an embodiment, for example, the MPDU 304 and the MPDU 306 are transmitted as shown in FIG. 3A.

In some embodiments, one of the first broadcast PPDU and the second broadcast PPDU is a non-legacy PPDU. In an embodiment, the non-legacy PPDU includes a medium access control (MAC) protocol data unit (MPDU) delimiter having an MPDU length field that indicates an octet length of a corresponding MPDU of the non-legacy PPDU. In an embodiment, the non-legacy PPDU includes a PHY header having an MPDU length field that indicates an octet length of a corresponding MPDU of the non-legacy PPDU. In an embodiment, the method 700 further includes generating the non-legacy PPDU to include a MAC header that omits a recipient address field, for example, the non-legacy PPDU includes the MPDU 400 (FIG. 4). In an embodiment, the non-legacy PPDU omits a sequence field from the MAC header.

Figure 8:
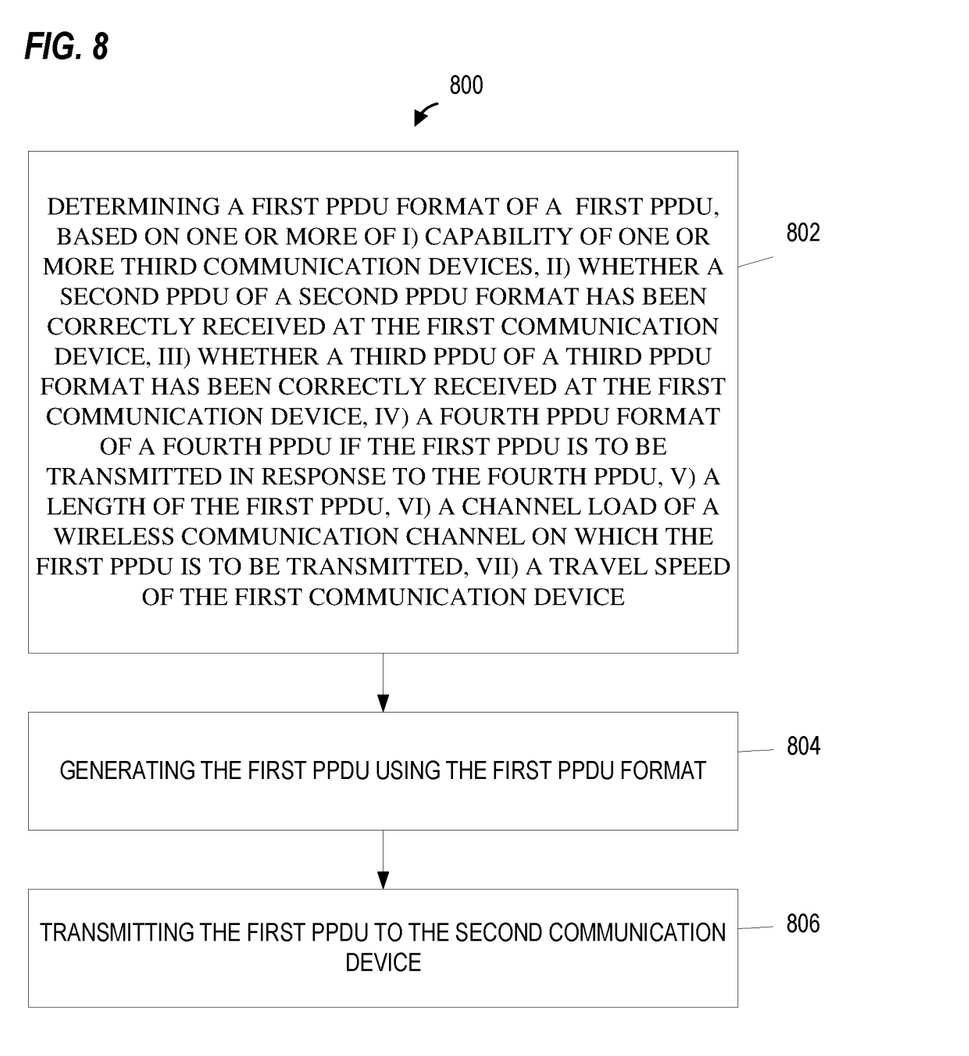
FIG. 8 is a flow diagram of another example method for generating a first PPDU to be transmitted from a first communication device to a second communication device, according to an embodiment.

FIG. 8 is a flow diagram of another example method 800 for generating a first PPDU to be transmitted from a first communication device to a second communication device, according to an embodiment. With reference to FIG. 1, the method 800 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 800. According to another embodiment, a MAC processor such as the MAC processor 126 or the MAC processor 166 is also configured to implement a portion of the method 800.

At block 802, a first PPDU format of the first PPDU is determined based on one or more of i) capability of one or more third communication devices, ii) whether a second PPDU of a second PPDU format has been correctly received at the first communication device, iii) whether a third PPDU of a third PPDU format has been correctly received at the first communication device, iv) a fourth PPDU format of a fourth PPDU if the first PPDU is to be transmitted in response to the fourth PPDU, v) a length of the first PPDU, vi) a channel load of a wireless communication channel on which the first PPDU is to be transmitted, and vii) a travel speed of the first communication device.

At block 804, the first PPDU is generated using the first PPDU format. In an embodiment, the first PPDU is the PPDU 504 (FIG. 5).

At block 806, the first PPDU is transmitted to the second communication device.

In some embodiments, determining the first PPDU format includes determining that the first PPDU format is a legacy PPDU format when the second PPDU format of the second PPDU is the legacy PPDU format. In an embodiment, for example, when a responding communication device receives the initiating PPDU 504, which has a legacy PPDU format, the responding communication device determines that the PPDU format of the responding PPDU 506 is the same, legacy PPDU format.

In some embodiments, determining the first PPDU format includes determining that the first PPDU format is a legacy PPDU format when a received PPDU from the second communication device includes a neighbor capability indicator that indicates a legacy-only capability of one or more third communication devices that neighbor the second communication device. In an embodiment, for example, a responding communication device receives an initiating PPDU (or other PPDU) such as the PPDU 504 that includes a neighbor report response (e.g., a radio measurement action frame). In an embodiment, the received PPDU has a data portion that includes the neighbor capability indicator.

In some embodiments, determining the first PPDU format includes determining that the first PPDU format is a legacy PPDU format when a previously received PPDU has a legacy PPDU format. In an embodiment, for example, a responding communication device uses the legacy PPDU format after determining that a received PPDU from an initiating communication device has a legacy PPDU format. In another embodiment, for example, a responding communication device uses the legacy PPDU format after determining that a received PPDU from a different communication device (i.e., different from an intended recipient of the responding PPDU) has the legacy PPDU format.

In some embodiments, determining the first PPDU format includes determining that the first PPDU format is a legacy PPDU format when one or more third communication devices that neighbor the first communication device have a legacy-only capability. In an embodiment, for example, the responding communication device determines the first PPDU format as the legacy PPDU format when an initiating PPDU includes a neighbor report that indicates that a neighbor communication device of the initiating communication device has a legacy-only capability.

Further aspects of the present application relate to one or more of the following embodiments.

Embodiment 1: A method, performed at a first communication device, for transmitting a physical layer (PHY) protocol data unit (PPDU), the method comprising: receiving an initiating PPDU from a second communication device, the initiating PPDU having a PHY header that indicates a first PPDU format of the initiating PPDU and a PPDU format field that indicates a second PPDU format of a responding PPDU to be transmitted in response to the initiating PPDU; generating the responding PPDU using the second PPDU format; and transmitting the responding PPDU in response to the initiating PPDU.

Embodiment 2: The method of Embodiment 1, wherein the first PPDU format is a non-legacy PPDU format and the second PPDU format is a legacy PPDU format.

Embodiment 3: The method of any of Embodiments 1-2, wherein: the PHY header of the initiating PPDU has a modulation and coding scheme (MCS) field that indicates a modulation and coding scheme of the initiating PPDU; and generating the responding PPDU comprises generating the responding PPDU using the second PPDU format and the modulation and coding scheme indicated by the MCS field.

Embodiment 4: The method of any of Embodiments 1-3, wherein: the initiating PPDU includes a medium access control (MAC) protocol data unit (MPDU) delimiter having an MPDU length field that indicates an octet length of a corresponding MPDU of the initiating PPDU.

Embodiment 5: The method of any of Embodiments 1-3, wherein: the initiating PPDU includes a PHY header having an MPDU length field that indicates an octet length of a corresponding MPDU of the initiating PPDU.

Embodiment 6: A method, performed at a first communication device, for transmitting a broadcast physical layer (PHY) service data unit (PSDU), the method comprising: receiving the broadcast PSDU; generating a first broadcast PHY protocol data unit (PPDU) that includes the broadcast PSDU and has a first PPDU format; generating a second broadcast PPDU that includes the broadcast PSDU and has a second PPDU format that is different from the first PPDU format; transmitting i) the first broadcast PPDU, and ii) the second broadcast PPDU after transmitting the first broadcast PPDU; wherein generating the first broadcast PPDU comprises generating the first broadcast PPDU to include a duration indicator that indicates the presence of the second broadcast PPDU.

Embodiment 7: The method of Embodiment 6, wherein transmitting the first second broadcast PPDU comprises transmitting the second broadcast PPDU after a short interframe space (SIFS) period after the first broadcast PPDU.

Embodiment 8: The method of any of Embodiments 6-7, wherein the duration indicator is configured to reserve a transmission opportunity (TXOP) that includes the first broadcast PPDU and the second broadcast PPDU.

Embodiment 9: The method of any of Embodiments 6-8, wherein the first PPDU format is a legacy PPDU format configured to be processable by a legacy communication device.

Embodiment 10: The method of any of Embodiments 6-8, wherein the second PPDU format is a legacy PPDU format configured to be processable by a legacy communication device.

Embodiment 11: The method of any of Embodiments 6-8, wherein: one of the first broadcast PPDU and the second broadcast PPDU is a non-legacy PPDU; and the non-legacy PPDU includes a medium access control (MAC) protocol data unit (MPDU) delimiter having an MPDU length field that indicates an octet length of a corresponding MPDU of the non-legacy PPDU.

Embodiment 12: The method of any of Embodiments 6-8, wherein: one of the first broadcast PPDU and the second broadcast PPDU is a non-legacy PPDU; and the non-legacy PPDU includes a PHY header having an MPDU length field that indicates an octet length of a corresponding MPDU of the non-legacy PPDU.

Embodiment 13: The method of any of Embodiments 6-12, wherein one of the first broadcast PPDU and the second broadcast PPDU is a non-legacy PPDU; and the method further comprises generating the non-legacy PPDU to include a MAC header that omits a recipient address field.

Embodiment 14: The method of any of Embodiments 6-13, wherein generating the non-legacy PPDU includes generating the non-legacy PPDU to omit a sequence field from the MAC header.

Embodiment 15: A method for generating a first physical layer (PHY) protocol data unit (PPDU) to be transmitted from a first communication device to a second communication device, the method comprising: determining, by the first communication device, a first PPDU format of the first PPDU, based on one or more of i) capability of one or more third communication devices, ii) whether a second PPDU of a second PPDU format has been correctly received at the first communication device, iii) whether a third PPDU of a third PPDU format has been correctly received at the first communication device, iv) a fourth PPDU format of a fourth PPDU if the first PPDU is to be transmitted in response to the fourth PPDU, v) a length of the first PPDU, vi) a channel load of a wireless communication channel on which the first PPDU is to be transmitted, and vii) a travel speed of the first communication device; generating, at the first communication device, the first PPDU using the first PPDU format; and transmitting, at the first communication device, the first PPDU to the second communication device.

Embodiment 16: The method of Embodiment 15, wherein determining the first PPDU format comprises determining that the first PPDU format is a legacy PPDU format when the second PPDU format of the second PPDU is the legacy PPDU format.

Embodiment 17: The method of Embodiment 15, wherein determining the first PPDU format comprises determining that the first PPDU format is a legacy PPDU format when a received PPDU from the second communication device includes a neighbor capability indicator that indicates a legacy-only capability of one or more third communication devices that neighbor the second communication device.

Embodiment 18: The method of Embodiment 17, wherein the received PPDU has a data portion that includes the neighbor capability indicator.

Embodiment 19: The method of Embodiment 15, wherein determining the first PPDU format comprises determining that the first PPDU format is a legacy PPDU format when a previously received PPDU has a legacy PPDU format.

Embodiment 20: The method of Embodiment 15, wherein determining the first PPDU format comprises determining that the first PPDU format is a legacy PPDU format when one or more third communication devices that neighbor the first communication device have a legacy-only capability.

Embodiment 21: A network interface device configured to implement any of the methods of Embodiments 1-5.

Embodiment 22: A network interface device configured to implement any of the methods of Embodiments 6-14.

Embodiment 23: A network interface device configured to implement any of the methods of Embodiments 15-20.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, one or more integrated circuits (ICs), an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication, the method performed at a first communication device that is configured to process packets that conform to a first physical layer (PHY) protocol for wireless vehicular communications and packets that conform to a second PHY protocol for wireless vehicular communications, wherein the first PHY protocol is different from the second PHY protocol, the method comprising:
   determining, at the first communication device, that one or more second communication devices neighboring the first communication device are not capable of processing packets that conform to the second PHY protocol; and
   transmitting, by the first communication device, a first packet to a third communication device that is configured to process packets that conform to the first PHY protocol and packets that conform to the second PHY protocol, the first packet indicating that the one or more second communication devices neighboring the first communication device are not capable of processing packets that conform to the second PHY protocol to inform the third communication device of the one or more second communication devices, wherein the third communication device is different from the one or more second communication devise.

2. The method of claim 1, further comprising, after transmitting the first packet:
   receiving, at the first communication device, a second packet from the third communication device, the third packet conforming to the first PHY protocol and being configured to start a transmit opportunity period (TXOP); and
   receiving, at the first communication device, a third packet from the third communication device during the TXOP, the third packet conforming to the second PHY protocol and a frame for the first communication device.

3. The method of claim 1, wherein receiving the third packet comprises:
   beginning reception of the third packet a defined time period after an end of reception of the second packet.

4. The method of claim 3, wherein receiving the third packet comprises:
   beginning reception of the third packet a short interframe space (SIFS) after an end of reception of the second packet.

5. The method of claim 1, wherein determining that one or more second communication devices neighboring the first communication device are not capable of processing packets that conform to the second PHY protocol comprises:
   receiving, at the first communication device, a second packet from a particular second communication device, the second packet having an indicator that indicates the particular second communication device is not capable of processing packets that conform to the second PHY protocol; and
   determining that the particular second communication device is not capable of processing packets that conform to the second PHY protocol in response to receiving the indicator in the second packet.

6. The method of claim 1, wherein determining that one or more second communication devices neighboring the first communication device are not capable of processing packets that conform to the second PHY protocol comprises:
   receiving, at the first communication device, a second packet from a fourth communication device, the second packet having an indicator that indicates a particular second communication device is not capable of processing packets that conform to the second PHY protocol; and
   determining that the particular second communication device is not capable of processing packets that conform to the second PHY protocol in response to receiving the indicator in the second packet.

7. The method of claim 6, wherein receiving the second packet having the indicator that indicates the particular second communication device is not capable of processing packets that conform to the second PHY protocol comprises:
   receiving, within the second packet, a neighbor report that includes capability information regarding a plurality of communication devices, the neighbor report including the indicator that indicates the particular second communication device is not capable of processing packets that conform to the second PHY protocol.

8. The method of claim 1, determining that one or more second communication devices neighboring the first communication device are not capable of processing packets that conform to the second PHY protocol comprises:
    determining, at the first communication device, whether a particular second communication device has transmitted any second packets that conform to the second PHY protocol; and
    determining, at the first communication device, that the particular second communication device is not capable of processing packets that conform to the second PHY protocol based on determining that the particular second communication device has not transmitted any second packets that conform to the second PHY protocol.

9. A first communication device, comprising:
    a wireless network interface device configured to process packets that conform to a first physical layer (PHY) protocol for wireless vehicular communications and packets that conform to a second PHY protocol for wireless vehicular communications, wherein the first PHY protocol is different from the second PHY protocol, and wherein the wireless network interface device includes one or more integrated circuit (IC) devices configured to:
        determine that one or more second communication devices neighboring the first communication device are not capable of processing packets that conform to the second PHY protocol, and
        control the wireless network interface device to transmit a first packet to a third communication device that is configured to process packets that conform to the first PHY protocol and packets that conform to the second PHY protocol, the first packet indicating that the one or more second communication devices neighboring the first communication device are not capable of processing packets that conform to the second PHY protocol to inform the third communication device of the one or more second communication devices, wherein the third communication device is different from the one or more second communication devices.

10. The first communication device of claim 9, wherein the one or more IC devices are further configured to, after transmission of the first packet:
    receive a second packet from the third communication device, the third packet conforming to the first PHY protocol and being configured to start a transmit opportunity period (TXOP); and
    receive a third packet from the third communication device during the TXOP, the third packet conforming to the second PHY protocol and a frame for the first communication device.

11. The first communication device of claim 9, wherein the one or more IC devices are configured to:
    begin reception of the third packet a defined time period after an end of reception of the second packet.

12. The first communication device of claim 11, wherein the one or more IC devices are configured to:
    begin reception of the third packet a short interframe space (SIFS) after an end of reception of the second packet.

13. The first communication device of claim 9, wherein the one or more IC devices are further configured to determine that one or more second communication devices neighboring the first communication device are not capable of processing packets that conform to the second PHY protocol at least by:
    receiving a second packet from a particular second communication device, the second packet having an indicator that indicates the particular second communication device is not capable of processing packets that conform to the second PHY protocol; and
    determine that the particular second communication device is not capable of processing packets that conform to the second PHY protocol in response to receiving the indicator in the second packet.

14. The first communication device of claim 9, wherein the one or more IC devices are further configured to determine that one or more second communication devices neighboring the first communication device are not capable of processing packets that conform to the second PHY protocol at least by:
    receiving a second packet from a fourth communication device, the second packet having an indicator that indicates a particular second communication device is not capable of processing packets that conform to the second PHY protocol; and
    determining that the particular second communication device is not capable of processing packets that conform to the second PHY protocol in response to receiving the indicator in the second packet.

15. The first communication device of claim 14, wherein the one or more IC devices are further configured to:
    receive a neighbor report that includes capability information regarding a plurality of communication devices, the neighbor report including the indicator that indicates the particular second communication device is not capable of processing packets that conform to the second PHY protocol.

16. The first communication device of claim 9, wherein the one or more IC devices are further configured to determine that one or more second communication devices neighboring the first communication device are not capable of processing packets that conform to the second PHY protocol at least by:
    determining whether a particular second communication device has transmitted any second packets that conform to the second PHY protocol; and
    determining that the particular second communication device is not capable of processing packets that conform to the second PHY protocol based on determining that the particular second communication device has not transmitted any second packets that conform to the second PHY protocol.

17. The first communication device of claim 9, wherein the wireless network interface device comprises one or more transceivers implemented at least partially on the one or more IC devices.

18. The first communication device of claim 17, further comprising:
    one or more antennas coupled to the one or more transceivers.

19. The first communication device of claim 17, further comprising:
    a host processor coupled to the wireless network interface device.

20. The first communication device of claim 9, further comprising:
    a host processor coupled to the wireless network interface device.

* * * * *